United States Patent Office 3,527,776
Patented Sept. 8, 1970

3,527,776
OPTICAL RESOLUTION OF DL-LYSINE
Teruo Uzuki, Kanagawa-ken, and Naotake Sato and Takekazu Akashi, Tokyo, Japan, assignors to Ajinomoto Co., Inc., Tokyo, Japan
No Drawing. Filed Aug. 23, 1967, Ser. No. 662,579
Claims priority, application Japan, Aug. 31, 1966, 41/57,006; Oct. 27, 1966, 41/70,882; Jan. 28, 1967, 42/5,487
Int. Cl. C07c *143/56*
U.S. Cl. 260—372     6 Claims

ABSTRACT OF THE DISCLOSURE

Racemic lysine is resolved into the optically active enantiomorphs by conversion to the lysine salt of 3,5-dinitrobenzoic acid, anthraquinone-$\beta$-sulfonic acid, 1-chloronaphthalene-4-sulfonic acid, or $\beta$-naphthalenesulfonic acid, seeding of a supersaturated solution of the racemic salt with crystals of the optically active form of the salt, decomposition of the grown seed crystals and recovery of the liberated optically active lysine. The afore-mentioned aromatic acids are unique in forming lysine salts capable of being resolved by seeding.

BACKGROUND OF THE INVENTION

This invention relates to a method of optically resolving DL- or racemic lysine, and to lysine salts which are intermediates in the resolution method.

L-lysine is an amino acid essential in animal nutrition. Racemic lysine is readily prepared by known methods of synthesis but not useful as a nutrient. The known methods of optically resolving racemic lysine rely on the different solubilities of diastereoisomers formed by reacting DL-lysine with optically active materials (U.S. Pat. Nos. 2,657,230, 2,859,244; Italian Pat. No. 603,255; British Pat. No. 884,674). The optically active reagents employed are costly, and the known processes employ large amounts of organic solvents.

The object of the invention is the provision of a method which permits DL-lysine to be resolved into the optically active enantiomorphs by seeding of supersaturated aqueous solution of inexpensive derivatives of DL-lysine with the optically active form of the derivatives.

The optical resolution of racemic materials by seeding of their supersaturated solutions with an optically active enantiomorph was discovered late in the 19th century, and the method has been employed successfully with other amino acids on an industrial scale. Lysine and the conveniently available derivatives thereof which were known heretofore are not capable of optical resolution by seeding.

SUMMARY OF THE INVENTION

It has now been found that salts of racemic lysine with certain optically inactive aromatic acids differ from lysine and its salts available heretofore in being readily resolved by seeding of their supersaturated solutions with crystals of the corresponding optically active salts. The aromatic acids suitable for the purpose of this invention are 3,5-dinitrobenzoic acid, anthraquinone-$\beta$-sulfonic acid, 1-chloronaphthalene-4-sulfonic acid, and $\beta$-naphthalene-sulfonic acid.

The method of the invention essentially consists in reacting racemic lysine with one of the aromatic acids to form the salt in a conventional manner, preparing a supersaturated solution of the salt in an aqueous medium, contacting the solution with seed crystals of an optically active enantiomorph of the salt until the crystals grow by accretion of additional amounts of the enantiomorph, and separating the grown crystals. Optically active lysine is recovered after decomposition of the separated crystals.

The specific procedures employed in each of the enumerated steps may be entirely conventional in themselves, and are not necessarily at the core of this invention.

Solutions of the aromatic acid salts of DL-lysine or of optically active lysine are simply prepared by mixing aqueous solutions of equimolecular amounts of the components. Unless a supersaturated solution is directly obtained by the mixing step, the solution of the salt may be made supersaturated by evaporation of water, by cooling, or by the addition of a non-solvent miscible with water, such as a lower alkanol. The crystals obtained by seeding the supersaturated solution with the optically active form of the salt are readily decomposed by means of strong acids or suitable ion exchange resins, and the liberated, optically active lysine is then recovered by conventional methods.

DESCRIPTION OF PREFERRED EMBODIMENTS

The following examples are further illustrative of the present invention but it will be understood that the invention is not limited thereto.

Example 1

43.5 g. 3,5-dinitrobenzoic acid were dissolved in 100 ml. of an aqueous solution containing 30 g. DL-lysine. The mixture was stirred for 5 hours at room temperature, and was then left in a refrigerator overnight. Yellowish crystals of DL-lysine 3,5-dinitrobenzoate monohydrate precipitated on cooling and were filtered off. They weighed 63 g. (83% of theoretical yield). When recrystallized from water, they melted at 216° C. (decomp.). They were identified by elementary analysis:

Calc'd. for $C_{13}H_{18}N_4O_8 \cdot H_2O$ (percent): C, 41.49; H, 5.36; N, 14.89. Found (percent): C, 41.80; H, 5.38; N, 14.96.

A small amount of crystalline L-lysine 3,5-dinitrobenzoate was prepared from optically active lysine in an analogous manner and showed a specific rotation of +5.22 (C=4:$H_2O$), M.P. 216° C. The racemic and optically active salts had the following solubilities (g./100 g. water) calculated for the anhydrous form:

| | L-form | DL-form |
|---|---|---|
| 30° C | 7.48 | 15.17 |
| 50° C | 15.61 | 36.11 |
| 65° C | 31.58 | 77.55 |

Characteristic absorption bands appeared in the IR spectrum at 1540 cm.$^{-1}$ and 1345 cm.$^{-1}$ ($-NO_2$).

36 g. DL-lysine 3,5-dinitrobenzoate monohydrate were dissolved in 100 ml. water at 80° C. The solution was cooled gradually to 49.5° C. and seeded with 0.7 g. crystalline L-lysine 3,5-dinitrobenzoate monohydrate. Cooling was continued, with stirring, for 30 minutes whereupon the temperature reached 37.5° C. The crystals suspended in the aqueous medium were filtered off, washed with a small amount of cold water, and dried. They weighed 4.3 g. and had an optical purity of 95% as determined by measurement of specific rotation. They were further converted to L-lysine dihydrochloride as described in Example 2.

Example 2

144 g. DL-lysine 3,5-dinitrobenzoate monohydrate prepared as in Example 1 were dissolved in 400 ml. water at 70° C. The solution was cooled gradually to 49.5° C. and seeded with 1.0 g. crystalline L-lysine 3,5-dinitrobenzoate monohydrate. The seeded mixture was further cooled to 35° C. with stirring over a period of 40 minutes, and the crystals of L-lysine 3,5-dinitrobenzoate were recovered as in Example 1, but were not washed. The yield was 18.9 g., and the purity 90.1%.

The mother liquor was heated to above 80° C. with 34 g. DL-lysine 3,5-dinitrobenzoate monohydrate until the additional racemate completely dissolved. The solution was cooled to 55.5° C. and seeded with 1.4 g. D-lysine 3,5-dinitrobenzoate monohydrate prepared in the same manner as the L-form and having corresponding properties. 35.7 g. D-lysine 3,5-dinitrobenzoate monohydrate were recovered from the seeded mixture by cooling to 35° C. and filtering as described above. The optical purity was 93.9%.

The crystals of D-lysine 3,5-dinitrobenzoate monohydrate were mixed with 100 ml. 6 N hydrochloric acid, and the mixture was heated to 50° C., whereby 3,4-dinitrobenzoic acid was precipitated. It was removed by filtration, and the filtrate was evaporated to dryness in a vacuum to yield 19.8 g. D-lysine dihydrochloride.

Example 3

7.2 g. crystalline 3,5-dinitrobenzoic acid was added to 100 ml. of an aqueous solution of 14.6 g. DL-lysine and 1.5 g. L-lysine at a rate of 0.6 g. per five minutes with stirring at room temperature. Crystals of L-lysine 3,5-dinitrobenzoate monohydrate precipitated when the addition of 3,5-dinitrobenzoic acid was completed. They were quickly separated from the solution by filtration, and dried. The yield was 8.24 g., the optical purity 92.5%.

Example 4

L-lysine anthraquinone-$\beta$-sulfonate hemihydrate and the corresponding racemate were prepared from L-lysine and DL-lysine respectively and from equivalent amounts of the free aromatic acid as in Example 1. The specific rotation of the L-form of the salt was +1.76° (C=2:$H_2O$) and its melting point 247° C. The melting point of the DL-form was 246°. Both salts were identified by elementary analysis:

Calc'd. for $C_{20}H_{22}O_7N_2S \cdot 1/2H_2O$ (percent): C, 54.20; H, 5.23; N, 6.32. Found (percent): DL-form C, 53.87; H, 5.11; N, 6.03. L-form C, 54.81; H, 5.43; N, 5.85.

The salts have the following solubilities (g./100 g. water) calculated for the anhydrous form:

|     | L-form | DL-form |
| --- | --- | --- |
| 30° | 2.44 | 4.44 |
| 50° | 4.96 | 11.86 |
| 65° | 11.42 | 25.68 |

They show characteristic IR absorption bands at 1680 cm.$^{-1}$ (quinone), 1175 cm.$^{-1}$ (—$SO_3H$), and 1590 cm.$^{-1}$ (—COOH).

Pale yellowish crystals of DL-lysine anthraquinone-$\beta$-sulfonate hemihydrate (12 g.) were completely dissolved in 100 ml. water at 80° C. The solution was cooled to 40° C. and seeded with 0.3 g. of the L-form. After further cooling to 33° C. with stirring over 30 minutes, the precipitated crystals were quickly filtered off, washed with a little cold water, and dried. They weighed 1.2 g.

They were dissolved in 100 ml. water, and the solution was passed over 10 ml. of a strongly acidic cation exchange resin (Amberlite IR–120 in the H form) in a column. The column was eluted with 100 ml. 4 N aqueous ammonium hydroxide, and the eluate was evaporated to dryness in a vacuum. It consisted of 0.4 g. crystalline L-lysine having an optical purity of 87.3%.

Example 5

A solution of 18.2 g. DL-lysine hydrochloride in 400 ml. water at 50° C. was gradually cooled to 40° C. While this temperature was maintained, 4.7 g. L-lysine anthraquinone-$\beta$-sulfonate hemihydrate were added, and then 8.54 g. sodium anthraquinone-$\beta$-sulfonate at a rate of 0.6 g. per minute. The crystals of L-lysine anthraquinone-$\beta$-sulfonate hemihydrate, which precipitated, were quickly filtered off and dried. They weighed 9.12 g. and yielded 2.9 g. crystalline L-lysine of an optical purity of 82.8% when worked up as in Example 4.

Example 6

L-lysine 1-chloronaphthalene-4-sulfonate hemihydrate and the corresponding racemate were prepared by the method of Example 1 from L-lysine and DL-lysine respectively and from equimolecular amounts of 1-chloronaphthalene-4-sulfonic acid by the method of Example 1. The salts melted at 212° C. and the L-form had a specific rotation of +3.92° (C=4:$H_2O$). They were identified by elementary analysis:

Calc'd. for $C_{16}H_{21}O_5N_2SCl \cdot 1/2H_2O$ (percent): C, 46.21; H, 5.82; N, 6.74. Found (percent): DL-form C, 47.49; H, 5.37; N, 6.70. L-form C, 47.46; H, 5.39; N, 6.69.

Their solubilities (g./100 g. water) calculated for the anhydrous form are as follows:

|     | L-Form | DL-Form |
| --- | --- | --- |
| 30° C | 17.45 | 31.11 |
| 50° C | 37.57 | 69.52 |
| 65° C | 59.00 | 98.65 |

They showed characteristic absorption bands in the IR spectrum at 1165 cm.$^{-1}$ (—$SO_3H$) and 1575 cm.$^{-1}$ (—COOH).

A solution of 35 g. of the white crystals of DL-lysine 1-chloronaphthalene-4-sulfonate hemihydrate in 100 ml. water at 80° C. was gradually cooled to 35° C. and seeded with 0.9 g. of the crystalline L-form. The mixture was further cooled to 26° C. with stirring within 10 minutes. The precipitated crystals, when filtered off, washed, and dried, weighed 3.48 g. They were decomposed with ion exchange resin as described in Example 4, and 1.2 g. L-lysine having an optical purity of 86.6% was obtained.

Example 7

The L- and DL-forms of lysine $\beta$-naphthalenesulfonate monohydrate were prepared from the corresponding forms of lysine and the free aromatic acid in equimolecular amounts. The observed melting points were 350° C. and 335° C. respectively, and the specific rotation of the L-form was +4.65 (C=2:$H_2O$). Both salts were identified by elementary analysis, the L-form being dehydrated prior to analysis:

Calc'd. for $C_{16}H_{22}O_5N_2S \cdot H_2O$ (percent): C, 51.60; H, 6.50; N, 7.52. Found (percent): DL-form C, 51.55; H, 6.59; N, 7.52.

Calc'd. for $C_{16}H_{22}O_5N_2S$ (percent): C, 54.22; H, 6.27; N, 7.90. Found (percent): L-form C, 52.90; H, 6.01; N, 7.25.

The solubilities of the two salts, calculated for the anhydrous form, are as follows:

|     | L-Form | DL-Form |
| --- | --- | --- |
| 30° C | 16.57 | 33.62 |
| 40° C | 20.44 | 49.86 |
| 65° C | 29.79 | 68.07 |

Characteristic absorption bands were found in the IR spectra at 1590 cm.$^{-1}$ (—COOH) and 1160 cm.$^{-1}$ (—$SO_3H$).

50 g. of crystalline DL-lysine $\beta$-naphthalenesulfonate monohydrate, which was white, were completely dissolved in 50 ml. water at 80° C. The solution was cooled gradually to 40° C. and seeded with 0.1 g. L-lysine $\beta$-naphthalenesulfonate. Upon further cooling to 15° C. within 7 minutes, a slurry of crystals was obtained. The crystals were filtered off, washed with a little cold water, and dried. They weighed 3.82 g., and were converted to 1.45 g. L-lysine of 79.8% optical purity by treatment with ion-exchange resin as described in Example 4.

The D-forms of the several salts of lysine with the aromatic acids of the invention were prepared by seeding the racemate solutions with crystals prepared from D-lysine in an obvious manner. Their melting points and solubilities were identical within experimental errors with those of the L-forms more specifically described above. The rotation values were the same, but of opposite sign. It is possible to convert DL-lysine substantially completely into the enantiomorphs by a continuous batch process in which the mother liquors are employed for dissolving more of the racemate, and the D-form and the L-form are alternatingly seeded in a manner well known in itself.

Examples 1, 3 and 5 illustrate different methods of preparing a supersaturated solution of a racemic lysine salt of the invention and of seeding the same, and other methods, conventional in themselves will readily suggest themselves to those skilled in the art.

The salts may be prepared from free lysine and free aromatic acids, or from the soluble salts of either, lysine hydrochloride being merely typical of the more readily available lysine salts. The sodium, potassium, and ammonium salts of the aromatic acids are conveniently employed, but the nature of the cationic moiety in the aromatic acid salts is not important.

The methods of Examples 3 and 5 in which the seed crystals are formed in the supersaturated solution itself by spontaneous crystallization are useful for operation on a relatively small scale, as in a pilot plant, but more precise control of the resolution process on a larger scale is achieved at this time by seeding with added crystalline material. The quantity of the added seed crystals is not overly critical, and may vary between 0.5 and 10% of the weight of racemate in the supersaturated solution. The optimal amount under specific operating conditions and in specific equipment must be determined experimentally.

Water is an adequate solvent for the resolution process and is preferred because of its low cost, but the aqueous medium may contain water-soluble organic solvents, such as ethanol or other lower alkanols, and such solvents may be added to an aqueous solution of DL-lysine salts of the invention in order to induce supersaturation in a known manner, the salts being generally less soluble in the organic solvents than in water.

The temperature to be maintained during the resolution step must be between the freezing point and the boiling point of the medium employed and must be chosen to suit available equipment and the other process conditions chosen. It is not otherwise critical. With water as a solvent, the operating temperature cannot be substantially below 0° C. nor much above 100° C. unless a closed system is employed. No advantages are gained by operating outside of 20–80° C.

The separation of the seeded enantiomorph may be carried out in any desired manner. While filtration has been found convenient and has been specifically referred to above, other known separation methods are equally applicable, and centrifugal separation is specifically contemplated. Purification other than washing of the separated crystals with a little cold water is not normally required, and even washing is not always necessary.

Any strong acid or any strongly acidic cation exchange resin may be employed for decomposing the salts of optically active lysine with aromatic acids which are prepared by the method of the invention, and the aromatic acid may be recovered and returned to the process.

It should be understood, therefore, that the foregoing disclosure relates only to preferred embodiments of the invention, and that it is intended to cover all changes and modifications of the examples of the invention herein chosen for the purpose of the disclosure which do not constitute departures from the scope and spirit of the invention set forth in the appended claims.

What is claimed is:
1. A lysine salt of an aromatic acid selected from the group consisting of 3,5-dinitrobenzoic acid, anthraquinone-β-sulfonic acid, 1-chloronaphthalene-4-sulfonic acid, and β-naphthalenesulfonic acid.
2. A salt as set forth in claim 1 which is optically inactive.
3. A salt as set forth in claim 1, wherein said acid is 3,5-dinitrobenzoic acid.
4. A salt as set forth in claim 1, wherein said acid is anthraquinone-β-sulfonic acid.
5. A salt as set forth in claim 1, wherein said acid is 1-chloronaphthalene-4-sulfonic acid.
6. A salt as set forth in claim 1, wherein said salt is β-naphthalenesulfonic acid.

References Cited
UNITED STATES PATENTS 3,431,295  3/1969  Suverkropp _____ 260—501.11

OTHER REFERENCES

AAUX et al., Chemical Abstracts, vol. 64, col. 18203 (1966).

BERNARD HELFIN, Primary Examiner

M. W. GLYNN, Assistant Examiner

U.S. Cl. X.R.

260—501.11, 501.12, 534